(12) United States Patent
William Pickford (10) Patent No.: US 9,361,565 B2
(45) Date of Patent: Jun. 7, 2016

(54) DATA COMMUNICATION SYSTEM WITH PERCEPTIVE FILTER

(76) Inventor: Andrew Thomas William Pickford, Midlevels (CN)

( * ) Notice: Subject to any disclaimer, the term of this patent is extended or adjusted under 35 U.S.C. 154(b) by 1327 days.

(21) Appl. No.: 12/865,642

(22) PCT Filed: Jan. 30, 2009

(86) PCT No.: PCT/GB2009/000263
§ 371 (c)(1),
(2), (4) Date: Nov. 15, 2010

(87) PCT Pub. No.: WO2009/095682
PCT Pub. Date: Aug. 6, 2009

(65) Prior Publication Data
US 2011/0049246 A1    Mar. 3, 2011

(30) Foreign Application Priority Data
Jan. 31, 2008    (GB) .................................. 0801807.9

(51) Int. Cl.
*G06K 19/07* (2006.01)
(52) U.S. Cl.
CPC ........ *G06K 19/0723* (2013.01); *G06K 19/0704* (2013.01); *G06K 19/0707* (2013.01)
(58) Field of Classification Search
USPC ....................................................... 235/492
See application file for complete search history.

(56) References Cited

U.S. PATENT DOCUMENTS

| 2003/0019942 | A1 | 1/2003 | Blossom | |
|---|---|---|---|---|
| 2003/0231106 | A1 | 12/2003 | Shafer | |
| 2007/0052540 | A1* | 3/2007 | Hall | G08B 13/24 340/572.1 |
| 2007/0067290 | A1* | 3/2007 | Makela | G06F 17/30041 |
| 2007/0200702 | A1* | 8/2007 | Chung | G06K 7/0008 340/572.1 |
| 2007/0257105 | A1* | 11/2007 | Owen | G06F 21/32 235/380 |
| 2008/0173717 | A1* | 7/2008 | Antebi | G01S 5/22 235/439 |
| 2008/0203159 | A1* | 8/2008 | Luetzelberger | G06K 7/10079 235/385 |
| 2010/0122174 | A1* | 5/2010 | Snibbe | G06Q 10/10 715/733 |
| 2012/0313758 | A1* | 12/2012 | Savarese | G06K 7/10079 340/10.1 |

FOREIGN PATENT DOCUMENTS

WO    2008010890 A2    1/2008

OTHER PUBLICATIONS

Henze N et al.: "Application of Photovoltaic Solar Cells in Planar Antenna Structures" International Conference on Antennas and Propagation, XX, XX, vol. 2, Apr. 3, 2003, pp. 731-734, XP009032451 (the whole document).

* cited by examiner

*Primary Examiner* — Michael G Lee
*Assistant Examiner* — David Tardif
(74) *Attorney, Agent, or Firm* — Blank Rome LLP; Michael C. Greenbaum; Jonathan R. King (57) ABSTRACT

A data communication device (1) for attachment to an object has a flexible substrate, a transmitter (3) adapted to transmit data in the form of electromagnetic radiation and a programmable memory (7). The device has a controller (5) for controlling the transmission of the data and a programming component for programming the device. A power source for the device comprises a power storage device (8) and a power extraction component (9) capable of extracting power from the environment in which the data communication device is located when in use. A data communication system includes the device and a reader for receiving electromagnetic radiation from the device. The reader includes a perceptive filter adapted to distinguish radiation received from the device from radiation received from other sources.

22 Claims, 9 Drawing Sheets

| Application | Configuration | Power source(s) | Connector type |
|---|---|---|---|
| Emergency exit sign | Fixed code transmission, external use, 24/7 operation | Battery / charged storage cell, PV cell | Galvanic coupling, sealed after programming in manufacture. |
| Road safety information sign | Partly re-programmable, external use, 24/7 operation | Battery / charged storage cell, PV cell | Removable galvanic connector, wireless reprogrammability by authorised programmer |
| General information sign | Low cost sign, fixed code transmission, indoor use, daylight operation only | Charged storage cell, PV cell | User-removable galvanic connector or sealed after programming in manufacture. |
| Bus stop information | Electronic note, partly re-programmable, 24/7 operation, external use | Battery / charged storage cell, PV cell | Removable galvanic connector, wireless reprogrammability by authorised programmer |
| Location or address identifier | Fixed code transmission, external use, 24/7 operation | Battery / charged storage cell, PV cell | Removable galvanic connector |
| GPS / Galileo location assistance information | Partly re-programmable, external use, 24/7 operation | Battery / charged storage cell, PV cell | Removable galvanic connector, wireless reprogrammability by authorised programmer |
| Parking space designation sign | Partly re-programmable, external use, 24/7 operation | Battery / charged storage cell, PV cell | Removable galvanic connector, wireless reprogrammability by authorised programmer |
| Motorcycle / cycle presence indicator | Directional antenna radiation pattern, very harsh environment, 24/7 operation | Battery / charged storage cell, PV cell | Galvanic coupling, sealed after programming in manufacture. |

Figure 6

| Frequency Category | Features |
|---|---|
| Low Frequency (LF) | • 9-135KHz, 125 KHz<br>• Mass market, global.<br>• Inductive antenna.<br>• Can penetrate of non-metallic objects e.g. tagging of animals, clothes, FMCGs and airline baggage. |
| High Frequency (HF) | • 13.56 MHz<br>• Mass market, global.<br>• Applications include contactless smart cards for transit such as Oyster.<br>• ISM[1] band |
| Ultra High Frequency (UHF) | • 433 MHz and 868 – 915 MHz (433MHz and 869MHz in Europe, US permits higher power operation at 915MHz).<br>• Applications include peer to peer communications, and passive and active tags at 868 MHz (in Europe) |
| Microwave | • 2.45 GHz, active and passive tags (Surface Acoustic Wave Devices (SAW) and applications include automatic vehicle identification (AVI) for vehicle applications<br>• 2.45 GHz 802.11b/g/n/p for W-LAN<br>• 2.45GHz for Bluetooth Personal Area Networks (PAN) and *Wibree*-compliant devices.<br>• 5.8 GHz (5.9GHz in Italy and US) for a range of applications including Automatic Vehicle Identification. |
| UWB | • 2-10 GHz (typically 3 - 6GHz), spread spectrum, time domain communications, active tag<br>• Applications include highly directional military use wall penetrating radar and civilian applications requiring target localisation. |
| Infrared (IR) | • Includes 950nm wavelength for short range, directional communications. |
| Optical | • Various visible spectrum frequencies for short range communications. |

DATA COMMUNICATION SYSTEM WITH PERCEPTIVE FILTER

REFERENCE TO RELATED APPLICATIONS

The present application is the U.S. national phase of PCT International Patent Application No. PCT/GB2009/000263, filed Jan. 30, 2009, published on Aug. 6, 2009, as WO 2009/096582 A1, which claims the benefit of GB Patent Application No. 0801807.9, filed Jan. 31, 2008, whose disclosures are hereby incorporated by reference in their entirety into the present disclosure.

FIELD OF THE INVENTION

The present invention relates to a data communication device and system, in particular the device taking the form of a radio frequency-enabled label.

BACKGROUND TO THE INVENTION

Since the latter part of the 20th century there has been a prolific expansion in technology for providing data from a source to one or more third parties. In many cases the data are transmitted via a wireless communication system and this has been supported by wireless networks such as those provided by mobile network operators. Such systems often include usage-based charges which are levied against the data recipient in respect of the content delivered. Thus, whilst such systems often provide a great deal of useful data which may include local geographical content, the charge for receipt of such data which is used to support the extensive mobile telephone networks prevents the widespread usage of such systems. Furthermore, the number of content providers is also limited since there is no cheap and simple means of providing this content without entering into contracts with the network service providers. This creates an opportunity and indeed a need for users to provide and/or access content using mobile devices that are not subject to the same restrictions. For example, many users may wish to provide location-specific data to local recipients without the involvement of local, regional, national or international communication networks.

In general such desirable systems would not require long distance communication abilities or a complex interface and therefore accordingly could be implemented in relatively small devices for short-range communication (of the order of a few meters).

A number of short-range communication systems are known. One such example system is that of RFID tags. Many such tags are proprietary and require specialised readers. Indeed there are few generally accepted standards that apply to the RFID technology which has meant that specific systems are mostly implemented in closed user group applications. Examples of RFID technology used in specific systems are the tagging of animals, the tracking of courier packages and the monitoring of passengers or vehicles in transport systems. Each of these implementations is very specific and the devices available to implement them may only be used for a single purpose in a non-transferable manner.

There is therefore a strong desire to provide a wireless communication system which is adaptable to many different applications and which allows the simple control of the content by a non-expert user.

SUMMARY OF THE INVENTION

In accordance with a first aspect of the present invention we provide a data communication device for attachment to an object, the device comprising:— a flexible substrate;
a transmitter adapted to transmit data in the form of electromagnetic radiation;
a programmable memory;
a controller for controlling the transmission of the data;
a programming means for programming the device; and,
a power source having:—
 i) a power storage device; and,
 ii) a power extraction means capable of extracting power from the environment in which the data communication device is located when in use.

We have realised that a device in accordance with the first aspect of the invention provides each of the features needed to meet the objects of the invention. Specifically, the device may be formed upon a flexible substrate so that it may be attached to or incorporated within a vast range of different objects which may either be stationary or in motion.

The flexible substrate may take a number of forms and may function as a support layer. However, the flexible substrate may perform further functions, such as if the substrate takes the form of a printed circuit board to which the electronic components are connected. Such substrates may be based upon combinations of metallic and plastics materials. Whilst certain components may only tolerate low levels of strain (such as integrated circuits) typically such components can be selected so as to minimise any restrictions these might place upon the flexibility of the device. For example current UK-issued chip cards place the chip near the edge rather than in the centre where most of the bending stress is contained when the card is bent. The device design might also include reduced flexibility in such regions to prevent de-bonding or component damage. It should also be noted that the substrate may be arranged to be resilient or to deform plastically. The degree of flexibility may be controlled by the intended application and may include semi-rigidity. However, it is not intended that the degree of flexibility is less than that of a conventional credit card.

The transmitter provides for the transmission of data using electromagnetic radiation. The device also includes an on-board memory which is programmable and therefore allows the content to be controlled by a user with suitable programming equipment. The operation of the device including the transmission of data, and the access and storage of data within the programmable memory, is controlled by a controller. The means for programming the device allows it to be customised to the desired application.

A further requirement is the provision of an on-board power source. This comprises a power storage device, together with a power extraction means which functions as a separate source of power for the device. In general, the power storage device will be a charge storage device such as a battery or capacitor. The power extraction means provides a source of top up energy such as a photovoltaic (PV) cell or other component that can scavenge power from the object to which it is attached and/or its surroundings. The charging device may be operative by mechanical deformation or may otherwise be able to scavenge energy from its surroundings by other means. The power extracted from the environment by the power extraction means may be used to charge the power storage device and/or power the device as a whole. The power source allows for the transmission of the data with sufficient power to enable communication with a reading device at a relatively remote location (up to 5 to 10 meters for example). Thus, in one example the device may be adapted to use a photovoltaic source as its primary energy source during hours of sunlight or daylight, and use the battery backup or charge storage device during conditions of low light or nighttime.

Preferably the device also includes a receiver which is adapted to receive data in the form of electromagnetic radiation. In such cases it will be appreciated that an integral transceiver may be provided which comprises the receiver and transmitter. In general an antenna will also be provided, depending upon the electromagnetic frequency utilised. For example the antenna may be a radio frequency (RF) antenna although at higher frequencies such as the microwave and even optical frequencies, an appropriate "antenna" for such frequencies may be utilised.

Whilst the controller may be provided as a single integral controller, typically the controller takes the form of a microcontroller for processing the data, and a base-band processor, in communication with the microcontroller. The baseband processor performs the functions of demodulating the electromagnetic radiation received and forming it into data and/or modulating the transmitted electromagnetic radiation in accordance with the data to be transmitted. The controller may be programmable so as to allow customisation to suit specific applications such as power management and broadcast periodicity. Any application-specific encoding will typically be performed at the time of manufacture. Programming may require on-board error checking and other data manipulation. These could be performed off-board although this may compromise the device data security. The device is provided with enhanced utility if a controller is employed as part of the programming function.

The data received and transmitted may be stored in the on-board programmable memory. Typically the memory comprises a Read Only Memory (ROM) part and a Random Access Memory (RAM) part. The ROM may hold "fixed" data such as the operating code, device serial number and initialisation and personalisation data, whereas the RAM may hold other data such as working memory or other temporary storage data and content data.

Typically the data transmitted by the device will be descriptive of the object (and/or its location) to which the device is attached in use. Such an object might include a building, a vehicle, product packaging, a product itself or indeed any other object about which a third party may wish to obtain information. The device may describe the location rather than the object or information left by another user such as an advert that relates to another location. A number of different means of attaching the device to the objects are envisaged although the device may comprise an adhesive region for attachment to the object. The device may utilise other fixing methods such as mounting holes. It may also be designed to be nailed to the object. Thus the device may take the form of a stick-on label which may be applied manually or automatically. The adhesive may allow the label to be removed for re-use or more typically may resist removal of the device from the object.

One particular advantage of the device is its ability to be programmed through the means for programming. Programmability is desirable at two key stages of the life of the device, firstly, late on in the production process following assembly into a functioning device and, secondly, once deployed in the field.

In principle the programming may occur through programming data which is transmitted via electromagnetic radiation to the receiver. However it is preferred that the programming means may comprise an interface for connecting the device physically to an external apparatus such as a PC by a non-expert user. Thus the interface may take the form of a USB connector or other known connectivity method. Such an interface may be provided in a "once only" usable form such as by adapting a tear-off configuration, or it may be a permanent feature allowing the device to be reprogrammed.

In some cases the device may also include one or more sensors adapted to monitor the environmental conditions in which the device is positioned and/or the operation of the components of the device such as power levels and so on. The information provided by the sensors may be used by the controller as part of the transmitted data content or it may be used internally only, so as to control the operation of the device.

Although various physical geometries of the device are contemplated, one particularly advantageous arrangement is one in which the device is generally planar. This is advantageous in that it enables a low profile to be maintained with respect to the object to which the device is attached and, depending upon the on-board components, may provide for example a convenient large surface area for a photovoltaic cell or indeed a ground plane for directional transmission of radiation.

The device is also preferably of a multi-layered construction, particularly where a generally planar geometry is adopted. Such layers may include specific layers for example for the on-board power source, the electronics and for the antenna respectively. It is also preferred that one or more additional protective coatings are provided, one of which may be a rigid housing.

In order to provide for generic and widespread use of the device according to the first aspect, preferably the data that are transmitted by the device comprises descriptive data and content data. The descriptive data is used to define the content or to describe the object and allows any recipient of the transmitted data to determine quickly whether the data is of interest to that particular recipient. The content data may describe or give information about the object to which the device is attached.

Depending upon the application, the controller of the device may be adapted to communicate selectively with other apparatus (such as readers) using the electromagnetic radiation. Such selectivity may be in accordance with one or more of energy consumption, stored energy levels or data communication requirements. The controller may also be adapted to control the power consumption of the device according to one or more predetermined criteria, for example to minimise power consumption.

In accordance with the second aspect of the present invention we provide a data communication system comprising a device according to the first aspect; and, a reader for receiving electromagnetic radiation from the device; wherein the reader comprises a perceptive filter adapted to distinguish radiation received from the device from radiation received from other sources. The perceptive filter may therefore also use the descriptive data to determine whether or not the content is relevant to that particular reader. The perceptive filter in the reading device may examine the 'content' field of the data transmitted to decide if the content is relative to the application of the reader. This enables the data communication device to be application-specific and minimises the effort required by readers to determine the relevance of the device data, particularly if there are lots of devices in proximity to the reader. Preferably the reader is further adapted to transmit electromagnetic radiation to the device. This allows the reprogramming of suitably adapted devices.

Aside from the perceptive filter feature, the hardware of the reader may take a known form of for example an RFID tag reader or mobile phone adapted for the purpose.

BRIEF DESCRIPTION OF THE DRAWINGS

Some examples of a device and system according to the present invention are now described, with reference to the accompanying drawings, in which:—

FIG. 6 is a table of various further application options;

DESCRIPTION OF EMBODIMENTS

Figure 1:
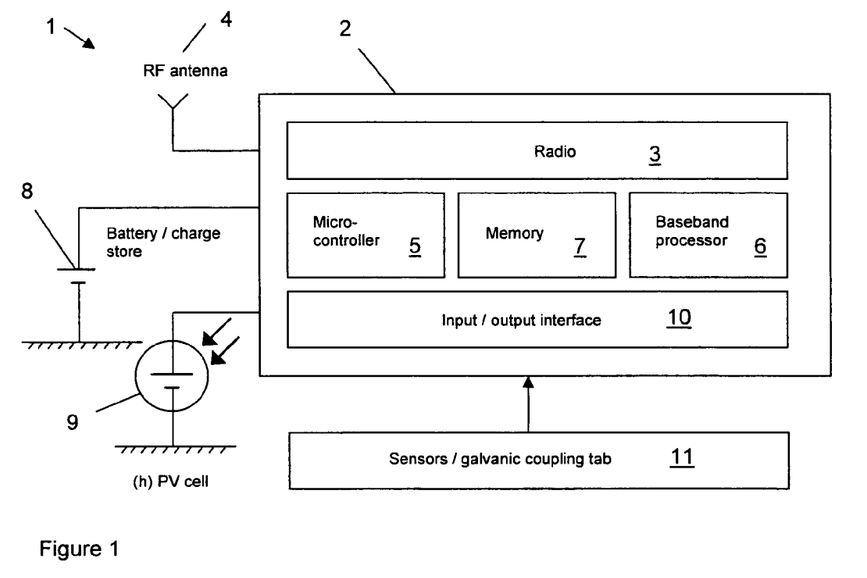
FIG. 1 is a schematic representation of the components of a first example device.

A first example of a device embodying the present invention is shown in FIG. 1. This device is described below in terms of a physical device or product known as an "e-note" which is typically a small label-type device for attachment to an object and for transmitting data pertaining to that object for receipt in the local vicinity. The e-note device generally indicated at 1 comprises a flexible substrate 2 formed from a polymeric material. The thickness of the substrate is approximately 1 millimeter (although it may be thinner depending upon the implementation in question). In this case the e-note is a radio frequency (RF) device and is equipped with a radio 3 mounted to the flexible substrate 2. The radio is connected to an RF antenna 4 having a suitable form known in the art. This has a limited frequency range of operation and is used primarily as an intentional radiator (transmitter) and optionally, as a receive antenna. The e-note device does not need to depend upon the energy received in the incident wave to be able to transmit. The e-note may not need a reading device in the proximity to operate at all, since it may be arranged to simply transmit the data held in memory whether or not a reader is present or not. Alternatively the active transmitter may be arranged to require a wake up signal from a reader to transmit the data (known as "listen before talk") of the e-note. In each case the e-note transmitter can operate with energy that is not extracted from the reader. The radio 3 in this case has transmission and receiving functionality and, depending on application requirements, the e-note may be configured with a transmitter or transceiver. As a receiver the signal detected by the RF antenna 4 passes through a low noise amplifier before being demodulated. As a transmitter the base-band signal generated by the baseband processor 6 (discussed below) is modulated to the nominal transmitter frequency then passed through a power amplifier before being radiated by the antenna 4.

The device is controlled by a general controller having two separate components. These are a microcontroller 5 and baseband processor 6. The microcontroller 5 comprises hardcoded logic, memory, firmware, a software application or a mixture of these. It may also be an automaton that operates as a finite state machine. The base-band processor 6 has circuitry which performs the task of converting a data stream to RF energy. The RF circuitry may be mechanically linked to the processor (e.g. on the same substrate or packaged in the same enclosure).

In addition a memory 7 is provided comprising a combination of Read Only Memory (ROM) or Random Access Memory (RAM) to hold fixed data (e.g. operating code, device serial number and personalisation data) and variable data (working memory or other temporary storage data) respectively.

The e-note is powered by two separate power sources in the example of FIG. 1. The first power source is a battery 8 and the second a photovoltaic cell 9. Instead of the cell 9 the device may be provided with another power scavenging device that extracts energy from vibration, heat, and so on. The battery energises the microprocessor and enables the e-note to behave as an active tag (i.e. a source of radio energy). The battery may take the form of any device that can store a charge and be used as a source of power by the e-note. One of the novelties of the e-note principle is the ability, at the design stage, to vary the contribution made by the two principle energy sources; the photovoltaic cell or other power scavenging device and the battery. The photovoltaic cell 9 is the primary source of power that converts incident light energy into electrical energy and performs that the same task as the battery described above.

The e-note is further equipped with an input/output interface 10. This interface 10 may be used to communicate electronically through a detachable connector and wiring to a peripheral device for example to allow the e-note to be programmed. The connection to an external device may be provided by a galvanic coupling tab. Alternatively, or in addition, the interface 10 may be coupled with sensors to measure the local environmental conditions such as surface stress, temperature, light levels, sound or vibration levels, electrical power levels, and so on. The sensors and galvanic coupling tab are illustrated collectively at 11.

The principal components of an e-note as illustrated in the example of FIG. 1 can be implemented in various forms, these being somewhat dependent upon the frequency of electromagnetic radiation used, whether an omni-directional, or directional transmission system is required, together with the type of internal power source used and the characteristics of the object to which it is attached.

The overall size of the e-note is also dependent upon the power source (or mix of power sources) utilised. For example, with the present technology, a photovoltaic cell such as that illustrated at 9 in FIG. 1 could be provided in a laminar form where its minimum size is related to the conversion efficiency and indeed the extent to which it is relied upon solely as a source of power or only partially in conjunction with another power source such as the battery 8. It will also be understood that a charge storage device such as a capacitor could be used instead of a battery. Given a specific photovoltaic cell conversion efficiency then, for a given requirement of inner energy generation capacity, the size of the e-note would be defined accordingly. With regard to battery or charge storage devices, the use of these exclusively for powering the e-note provides both flexibility in terms of size and shape since they have a correspondingly higher energy density in comparison with photovoltaic cells.

Commercial implementations of the e-note will likely exhibit a compact form for easy distribution and use. It is preferred that an e-note having a battery and photovoltaic cell in combination (as in FIG. 1) would be formed as a flat multi-layer or sandwich-like construction. This is particularly feasible for high-volume manufacturing of the e-note. Typical photovoltaic cells known in the art generally have a flat configuration. The design of an e-note incorporating such cells is preferred to have a generally flat surface large enough to support a particular cell of given conversion efficiency that can deliver sufficient energy to drive the e-note circuitry. Nevertheless, the e-note is preferably flexible enough to be distorted to conform to the object to which it is attached.

Considering the example of FIG. 1 in more detail, the flexible substrate 2 is formed from a suitable material such as a plastic. Likewise each of the on-board components of the e-note is formed from materials capable of withstanding an acceptable level of strain. The use of flexible substrates together with plastic electronics permits flexible e-notes to be produced which are able to comply with the underlying mounting surface of an object such as a cylinder, truncated cone or the segment of a hemisphere. We have realised that the technology used in the production of smart cards (otherwise known as "integrated chip cards") and Subscriber Identity Module (SIM) cards can be used in the production of e-notes since these demonstrate that microprocessors can be laminated into a protective plastic enclosure whilst providing a galvanic interface to an external programmer/reader.

Figure 2:
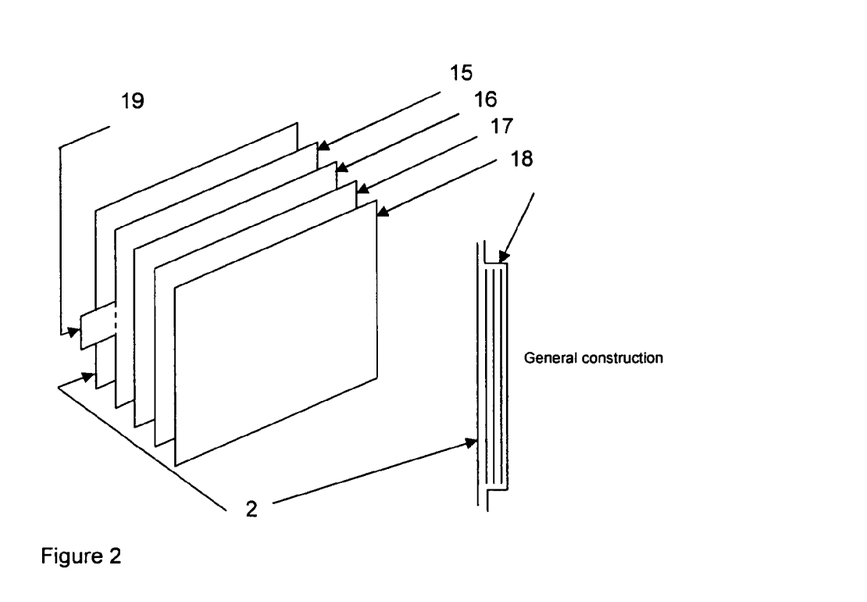
FIG. 2 shows the physical construction of the first example device.

FIG. 2 shows a multi-layer implementation of an e-note in accordance with FIG. 1. The substrate 2 is provided in a substantially planar form and upon this is mounted a layer of electronics which includes the radio 3, microcontroller 5, base-band processor 6, memory 7 and interface 10. These collectively form a processor layer 15. In a third layer in the stack, a power layer 16 overlies the processor layer 15. The power layer contains the photovoltaic cell 9 and RF antenna 4. The battery 8 may be provided in processor layer 15 or power layer 16. Note that with the use of a small photovoltaic cell 9, a single layer may be provided to perform the functions of layers 15 and 16. The layers 15 and 16 are mounted to one another and the substrate and are then protected by an encapsulating conformal layer 17 which provides protection from the environment. The specification of the conformal layer 17 will depend on the target environment, from the everyday temperatures and humidities faced in consumer applications to the harsh conditions found in exposed external locations such as buildings, lamp-posts, wooden stakes/posts, clothing and on vehicle bodies. Generally, the layer 17 will also minimise dendritic growth and protect against contaminants and water moisture. Other advanced coatings can also stimulate self-cleaning that could help maintain the light absorption properties if a photovoltaic cell were used.

As a final layer in the stack, a mechanical protective coating 18 is applied which provides further environmental protection and also a greater degree of physical protection from impact and abrasive damage. A polymer material may be used for this layer or for specialist applications vitreous compound or semiprecious stone such as sapphire the choice of which must also be consistent with the means of powering the e-note. The coating 18 must allow external light to reach the photovoltaic cell 9.

As can also be seen from FIG. 2 a galvanic coupling tab 19 is mounted to the processor layer 15. The right hand side of FIG. 2 illustrates a schematic view of the e-note cross-section and in particular illustrates that the mechanical layer 18 surrounds the internal layers and is bonded at the periphery to the substrate 2.

Figure 3:
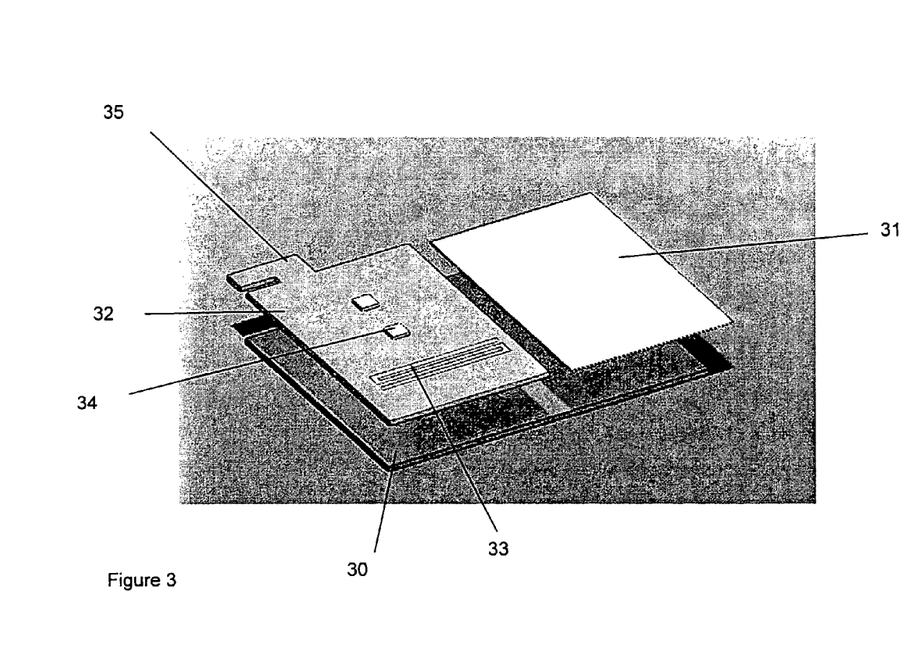
FIG. 3 shows the construction of a second example device.

FIG. 3 shows an alternative example arrangement. It should be noted that the substrate 2 and protective coating 18 described in the above example are omitted here for clarity but would be present in a practical device. In this device a battery 30 is the largest component used due to the functional requirements of the device of this example. The battery forms a first layer of the device. A solar panel 31 and printed circuit board 32 are accommodated side by side in a coplanar manner and form a second layer of the device. The printed circuit board 32 contains a microstrip antenna 33, a Bluetooth integrated circuit 34 and related control and supporting electronic components since this example device operates using the Bluetooth protocol. FIG. 3 also shows an optional tab 35 via which the device may be programmed using galvanic connection. If the optional tab is not used then alternative connections may be used to programme the device in the factory. The device may also be programmed by means of the primary radio-frequency communication link. Whilst FIGS. 2 and 3 show example arrangements it will be appreciated that the invention contemplates many alternative arrangements implemented using different components, some of which may be combined.

The e-note may be fixed with adhesive to the object in association with which it is intended to be used. This is particularly the case where a rough surface upon the object is provided (such as concrete or brick). A self-adhesive layer of the e-note may be used for smoother surfaces (for attachment to a sign or car body for example). The e-note may also be provided with holes (or regions for such holes to be drilled) where it is to be bolted to the object. Regions may also be provided for nailing the e-note to the object (such as when the object is a wooden post for example).

Some photovoltaic cells are based on a metallic substrate and this provides an ideal ground plane for an RF antenna that is laid on the photovoltaic cell itself. This construction provides directionality of the generated RF energy when this is most desired, reduces the component count of the e-note (since the photovoltaic cell 9 and RF antenna 4 are combined) and maximises the potential size of the antenna with little impact on the capacity of the cell for a given size. An e-note that is used in an application that requires omni-directional RF sensitivity or RF radiation pattern would benefit less from this ground plane. In this case the physical format will permit the antenna to be separated from the ground plane.

One of the key advantages of the e-note device is that it may be easily programmed and indeed re-programmed. For initial programming (otherwise known as 'personalisation') before the e-note is first used or each time it is re-programmed, the e-note provides a simple means of interfacing, either by a direct (galvanic) coupling (as shown by tab 19 in FIG. 2) or by means of the RF interface itself. Although both interfaces may be offered, only one of these may be suitable for the initial programming task, depending upon the application.

A galvanic interface may take the form of a contact area similar to that used on a SIM card. Alternatively, the contacts may take the form of 'fingers' such as those used for male Universal Serial Bus (USB) plugs. The usual form of male USB connectors, for example, is a PCB on which the contacts are etched, these protruding sufficiently to be inserted into a female USB socket on a PC. One of the benefits of this protruding connector is that it could be removed by cutting, bending along a line of weakness or tearing to leave a clean edge that would offer more protection from harsh environments than fully exposed contacts. Following removal of the connector in this case, the e-note is no longer programmable. The choice of galvanic connector may depend on the application of the e-note, the intended environment and level of tamper-resistance afforded by a removable connector.

For very harsh environments where a fixed code broadcast meets the application requirements then the e-note could be programmed via a galvanic coupling before encapsulation. In these fixed code applications, the format of the galvanic coupling can be chosen to maximise manufacturing efficiency since it would have no use in the field.

The choice of host controller (or indeed a communications chipset that incorporates a host controller) may offer a means of programming that has a non-proprietary galvanic interface such as a Universal Serial Interface but would nevertheless require a converter to enable a PDA or computer to programme the e-note. One option would be to include a converter on board the e-note (with the resulting increase in cost, complexity and volume of the e-note) or to provide an external converter. An economic value assessment based on application and volume requirements would help decide which option is justified.

Figure 4:
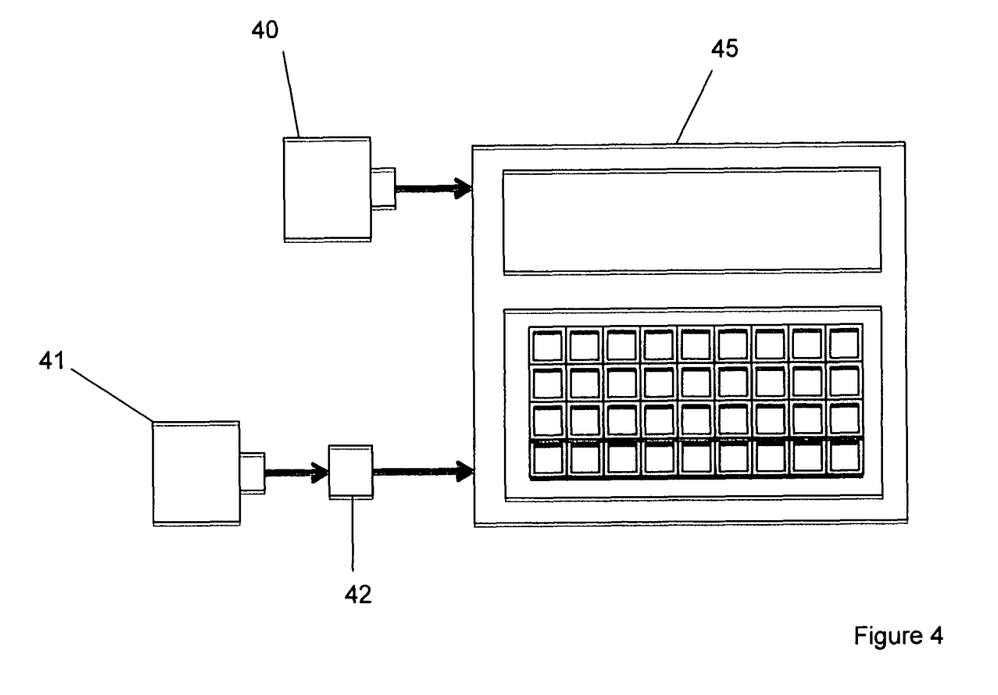
FIG. 4 shows two galvanic connection options.

FIG. 4 shows the use of two possible interfaces. An e-note 40 having a galvanic USB connector is illustrated which can connect directly into the USB port of a programming device such as the netbook PC 45. Alternatively, an e-note 41, which has a universal serial interface (USI) galvanic connector is coupled with an intermediate USI-to-USB converter 42 to allow the e-note 41 to be readily connected to the netbook PC for programming and other functions such as data read-out.

Figure 5:
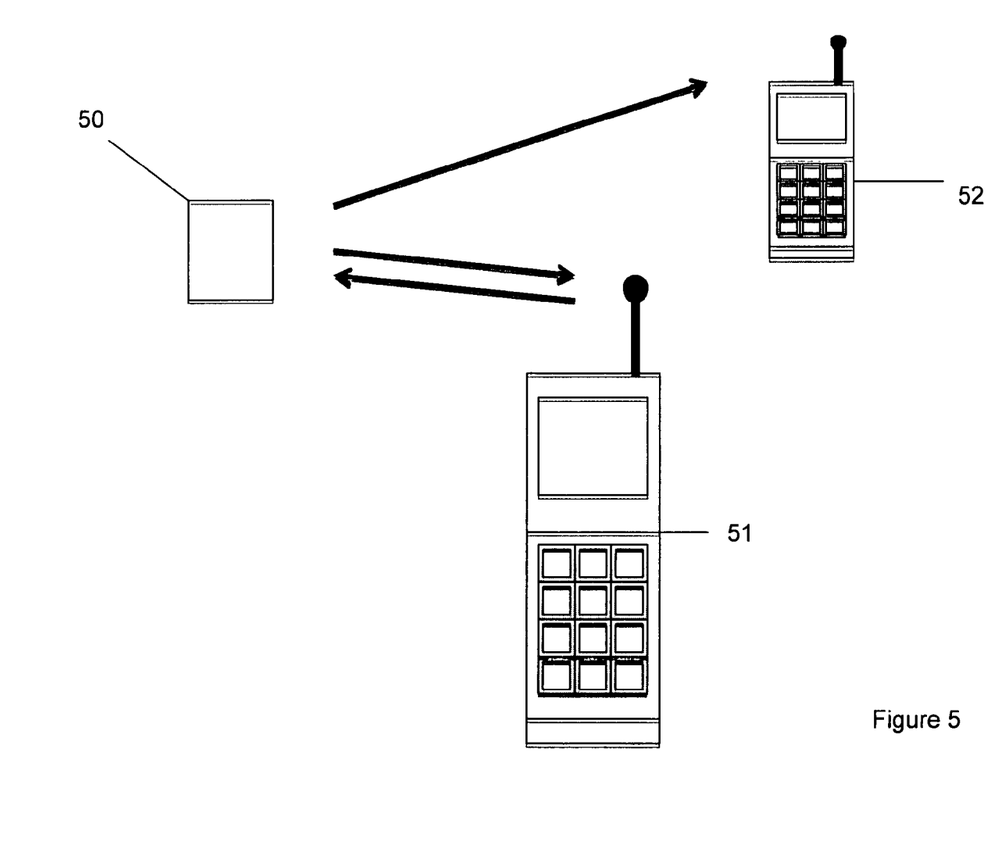
FIG. 5 shows a schematic representation of the use of mobile telephones for communication with the devices.

FIG. 5 shows schematically how an e-note may be programmed and read using mobile telephone handsets. An e-note 50 is provided with "over the air" programming functionality for example using Bluetooth. A first mobile telephone 51 is likewise equipped with Bluetooth capability and is in the possession of a person authorised to programme the e-note 50, in this case the owner of the e-note. The e-note owner operates the telephone 51 whilst within two-way communication range of the e-note 50 so as to gain access to its programming functions. This might include a security code to prevent later reprogramming. Following any security check the user controls the telephone handset 51 to deliver a programme to the e-note 50. Such a programme might contain instructions including the data to be transmitted by the e-note, the circumstances under which such data are to be transmitted, power management instructions and so on (some of these being described in more detail below). Once the programme has been uploaded the e-note begins normal operation according to its programming. During such normal operation, when a mobile telephone of any other passing person having Bluetooth enabled (represented by telephone handset 52), comes into Bluetooth range of the e-note, information is received by the telephone handset 52 from the e-note 50 and is presented to the user of the telephone handset 52. The e-note 50 may transmit periodically or may be programmed by its owner to receive a signal from such a telephone 52 before transmitting, this latter option reducing power consumption. If the e-note is programmed to receive and store any information from the telephone of users such as telephone handset 52 with which it communicates, then this can be later accessed by the owner of the e-note 50 using the telephone handset 51.

Some possible configurations and example application environments are described in FIG. 6 to illustrate the choice of power source, type of connector and mechanical format. FIG. 6 also highlights some of the combinations of degree of programmability, mix of power sources and programming interface that enable the e-note principles to be 'tuned' to meet application requirements.

The capacity of the energy storage device relates to its volume and the photovoltaic cell to its surface area, amongst many other factors including the chosen battery technology and cell technology chosen. Furthermore, the demands on these devices to deliver a sustainable source of energy will also depend on many factors relating to the application to which the e-note is put, for example the amount of traffic on the communication link (data length, transmission rates, etc) and it may be shown generally that there is a linear relationship between data traffic and energy consumption.

For example, assuming operation for one week without any external energy from a photovoltaic cell then it may be shown that, employing Bluetooth as the means of communication using an additional host controller, a typical consumption of 50 mAh of energy would be required. Consequently, a typical Lithium cell (a button cell is used here as an example) with a storage capacity of 0.010 mAh/mm$^3$ would need to have a volume of 50 mAh/0.010 mAh/mm$^3$ or 5000 mm$^3$ for an e-note to sustain its communication activity for the one week autonomy period. Alternatively, autonomy of one day would equate to a cell volume of 5000 mm$^3$/7 or 715 mm$^3$, that is less than half the volume of a Secure Digital (SD) card. It can be shown that with a message repetition rate of 30/sec, a combined average current consumption of the Bluetooth chipset and host controller of 280 µA (0.8 mW), a solar cell of 17% efficiency, a "worst case" solar energy produced (for the UK and Ireland) of 2.05 kWh/m$^2$ per day and a requirement for a 3-3.5 v battery, then about 7 to 8 silicon cells, each of about 60 mm$^2$ or a total of 420 mm$^2$ would be needed. The balance of e-note surface area in this example would be partially occupied by an antenna. This could be a microstrip antenna if communication at microwave frequencies was required.

Therefore, it can be seen that various design and component selection assumptions based on a high message repetition rate, typical energy demands and typical periods of energy autonomy, could easily result in a compact e-note structure with currently available commercial batteries, photovoltaic cells and communication link circuitry. Improvements in component performance and reduced energy consumption could further reduce the size of the e-note.

There are many more examples of environments and tagged objects that could be provided but the diversity of application is highlighted in FIG. 6 nevertheless.

The discussion above is given in respect of a nominal radio frequency. In general, the nominal radio frequency used by the physical layer interface between an e-note and a reader will depend on many factors, including regulatory permissions for unlicensed devices, availability of design expertise, availability of components, physical format of the RF antenna, operating range, duty cycle and available internal energy amongst others. Two main types of RFID tag are known in the art, namely "near field" and "far field". A 'near field' RFID tag is coupled by electromagnetic induction (by a wound inductive coil) to a "remote" reader and uses the reader's energising field as a source of power. A 'far field' RFID tag depends upon electric field coupling between the reader and tag. In most cases this type of RFID tag is powered internally so does not depend upon any energy transfer from a reader to power the tag. The present invention uses the far field regime. The use of an internal energy source (e.g. battery, charge storage device or photovoltaic cell) permits an e-note to operate well beyond the range of near field devices that are typically limited at 1 to 3 meters.

Figure 7:
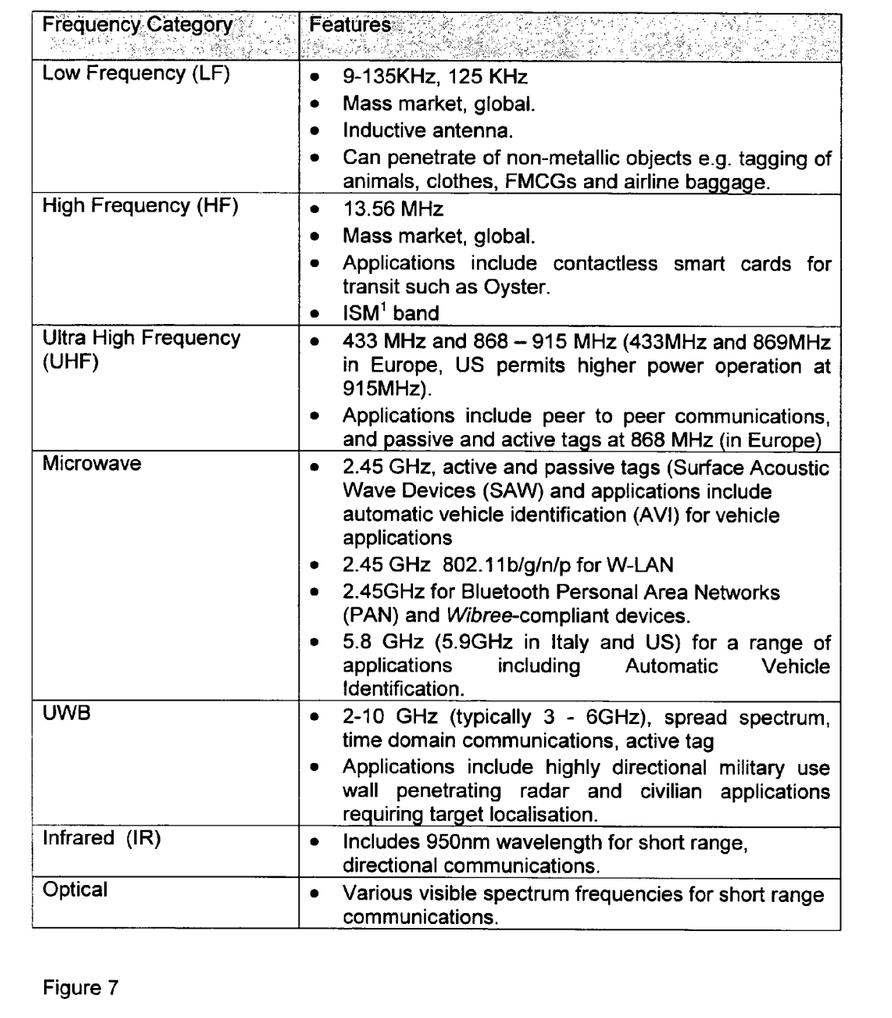
FIG. 7 is a table of example frequency ranges which may be used.

Available operating frequencies for low power wireless communication intended for civilian applications are shown in FIG. 7.

Potentially, the design principles of an e-note can apply to any of the frequency options listed in FIG. 7 although typically the low frequency (LF) and high frequency (HF) bands apply to very short range near field communication devices for civilian applications.

At each frequency band, the optimal antenna design will change from simple stubs through microstrip arrays to patch antennas then finally to optical devices at the IR and visible end of the spectrum. Planar antenna designs exist in UHF, microwave and Ultra Wide Band (UWB) whereas thicker and more mechanically complex designs would be needed (at present at least) for infra-red (IR) and optical devices.

The predominant applications of e-notes will be satisfied at UHF (e.g. 433 MHz and 869-915 MHz) and microwave frequencies (e.g. 2.45 GHz). A useful range of over 1 m for a self-powered e-note can be obtained at these frequencies and there is no reason why the directional properties of IR and optical cannot be exploited where higher directionality is required.

Figure 8:
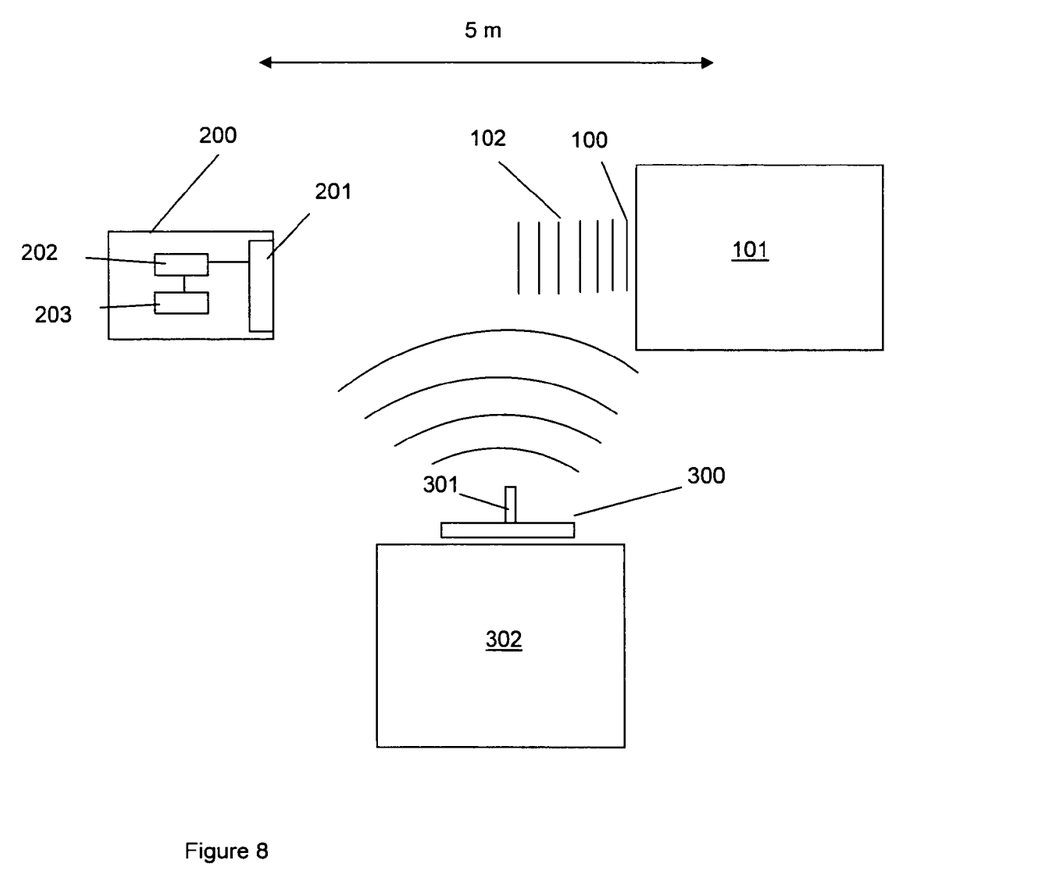
FIG. 8 is a schematic illustration of an example system containing the device of the first example.

FIG. 8 illustrates the use of e-notes to provide information regarding objects to which they are attached. In this case a first e-note 100 is attached to an object 101. The e-note 100 has a very compact and planar geometry that is also provided with a directional antenna which transmits radiation over a relatively narrow solid angle shown at 102. An e-note reader 200 is shown positioned in the vicinity of the e-note 100, in this case the distance being about 5 meters as illustrated in FIG. 8.

The reader 200 contains various components including a directional antenna 201, a processor 202 and perceptive filter 203. Other components which are present, although not indicated in FIG. 8, include a power source, memory and so on. The reader 200 may be provided as a compact handheld device or may indeed be located within a vehicle or upon a stationary object. For example this may "read" the e-notes of objects such as 101 as they are moved with respect to the reader 200. FIG. 8 illustrates the effect of the perceptive filter. Although the antenna 201 is positioned to receive information from the e-note 100, within the vicinity there is also a second e-note taking a different form illustrated at 300. This includes an omni-directional antenna 301 which transmits information over a wide solid angle. This information is transmitted with reference to the object 302 to which the second e-note 300 is attached. Thus the antenna 201 of the reader 200 receives information from each of the e-notes 100, 300. Of course these may transmit at different frequencies and therefore the information may be selectively received from either e-note using frequency filtering. However, assuming no such filtering is applied, or indeed if a similar frequency is used for each of the e-notes, the information received may then be distinguished by the internal processor 202 in collaboration with the perceptive filter 203.

The perceptive filter 203 may be programmed such that it only selects information from one of the two e-notes 100, 300. As mentioned earlier, the data transmitted from an e-note may include descriptive data and content data. This is an example of where the descriptive data may be used by the perceptive filter. For example if the reader 200 is mounted to a vehicle and is designed to provide navigation information, it will only wish to process navigation information received from e-notes which have been positioned for this purpose. The e-note 100 may be attached to a road sign indicating that the road ahead is closed whereas the e-note 300 may be related to an entirely different application, such as advertising upon a roadside billboard for providing information upon the product advertised to a portable device (such as a mobile telephone equipped with the reader technology). In this case the perceptive filter 203 may use the descriptive data received from each of the e-notes 100, 300 and determine quickly that only the information from the e-note 100 is to be considered and processed. This processing may then lead to the re-programming of navigational systems or simply the display of the navigation information to the driver of the vehicle in which the reader 200 is located.

It will be appreciated that in some circumstances the descriptive data may however provide insufficient information and therefore the perceptive filter may be programmed to review the content information and search for "key words" when the data is received so as to allow a determination as to which data should be selected and processed further by the processor 202.

It is envisaged that, in an environment in which a number of e-notes may be present (such as a busy street), the perceptive filter may provide an important means for ensuring that only information which is relevant to the task of the reader at that time is then processed despite this information being received amongst other information which is not relevant from other e-notes. It is envisaged that the perceptive filter may be fixed or configurable by the user or application from time-to-time.

Depending on the communications strategy chosen as part of the design of the e-note, the e-note may choose not to announce its presence to new readers during a communication session with one or more readers. The Bluetooth and Wibree communications specifications could support this 'invisibility' mode of operation when the e-note experiences high traffic levels. Other communications strategies may be enabled by other communication standards such as a broadcast facility that would not need the above since the e-note would not enter into private sessions with other readers and overall would not care how many readers were receiving.

Regarding other implementations of the e-note principles, as FIG. 6 highlights, the e-note can be configured with different levels of dependency on battery/charge storage device and photovoltaic cell. Thus the e-note could be programmed to use each of these energy sources in a predetermined manner, or dynamically.

It is possible to conserve energy by sleeping the microprocessor (and for example, a Bluetooth integrated circuit) when it is not sending messages (assuming that the e-note is designed only to respond on request). It would also be possible to reduce the message repetition rate when broadcasting when energy levels diminish. Performance could also be reduced only when the energy-scavenging device is not generating any energy. For example when the incident sunlight reduces over a period of one hour, the application requirements could assume that the demand on information stored on the e-note would also reduce. Overall, there may be many reasons why it would make sense to reduce the activity level of the e-note.

The target object itself to which the e-note is attached may provide a suitable energy source for the e-note. For example, the e-note may be able to scavenge power from its host object or its environment. The object may be heated, it may vibrate (or flex), it may be able to provide electrical energy or it may generate light. If the characteristics of the target object can be specified accurately then the e-note can be optimised accordingly. The e-note may also be configured to scavenge power from a reading device such as is used in near-field applications. However, it will be understood that the e-note is a far-field device since the near-field regime is not a requirement and any scavenged power in this case is simply additional.

As a minimum the e-note will need to withstand its target environment for as long as e-note functionality is required. This may be from a few seconds for a sacrificial application of e-notes (such as reporting the characteristics of hostile environments) to many years of useful service in more benign applications.

Typically, the e-note could be deployed with little effort or cost. The cost of the simplest e-note could be low enough to enable e-notes to be programmed and distributed to many locations efficiently by users with little or no knowledge of how the e-note works. Three usage scenarios are now described below, developed from the illustrative configurations of FIG. 6.

Electronic Marker Post

A user may wish to deploy fixed-code, pre-programmed e-notes as electronic markers, for example on a ski slope or any other route used in other leisure pursuits such as orienteering, off road driving, cross-country driving or tourist trails within cities.

For ski slopes, the fixed codes can represent the grade of difficulty of the slope, hazards or other safety related information. The e-note, which is mounted within a marker post, periodically broadcasts the pre-programmed fixed message at a rate that optimises the use of its stored energy (obtained from an integral photovoltaic cell and charge storage device as primary energy sources) with the expected duration that a skier is in the proximity of a reader (the window of opportunity for communication). A perceptive filter in the portable reader (e.g. in the form of a mobile phone, wristwatch or wearable computing device) will ensure that only relevant messages are presented to the skier. The perceptive filter could trigger a split timer in the reading device, alert the wearer audibly (or by vibration) in the extent that the slope is too challenging for the skier, or be used to select the appropriate information held within the reader for communication to the wearer.

Figure 9:
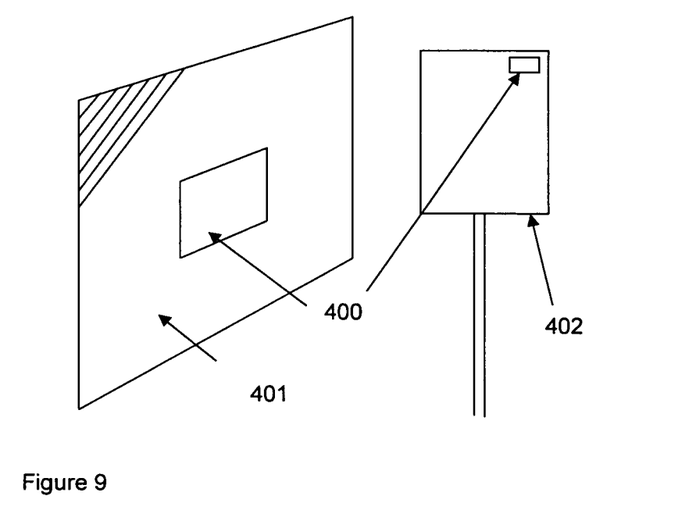
FIG. 9 shows the use of the device in a first example application.

FIG. 9 shows an e-note 400 mounted to a mounting surface 401, such as a flat surface of a signboard 402. Depending on the location, it will be appreciated that the e-note 400 may be powered exclusively by a photovoltaic cell or such a cell may be used in conjunction with a battery backup.

Alternatively, a tourist application would depend on e-notes fixed to suitable locations such as a building, sign, lamp-post or tree to broadcast a location code or short message that provides some information relating to the site at which the e-note is located. This location-specific content may supplement data that may be provided from other location-based services, particularly those where the position error of a satellite or terrestrial positioning system is much larger than the communication footprint of the e-note (discussed further in the Location Broadcast Marker example described below).

The amount of available energy stored within the e-note could be used to reduce the broadcast frequency of the e-note to ensure longer operation although at a reduced functionality. The nature of the application will dictate whether this is a desirable feature or not.

Location Broadcast Marker

The operation of satellite navigation systems such as the Global Positioning System (GPS) suffer from attenuation effects of concrete and other building materials that limits the use of Global Navigation Satellite System/Cellular Network (GNSS/CN) deep inside buildings. Limited visibility of satellite constellations usually means a longer Time To First Fix (TTFF) unless the mobile receiver has information on current satellite visibility that is provided over a wireless interface such as a cellular communication system.

An e-note that is programmed with standardised location data coordinates (e.g. WGS-84 or Zip code/street address/ floor number) can replace the need for location assistance information and/or visibility of satellite hence the term 'Location Broadcast Marker'. The US E9-1-1 and European e-112 initiatives specify how mobile terminals (e.g. handsets/ cellphones) provide location data to emergency services. The e-note can provide this position data if it cannot be derived quickly by other means.

A Location Broadcast Marker can also complement any positioning technologies on which location-based services depend. The marker can provide position or other assistance information that can be transmitted to an external service provider to deliver location-enhanced mobile services to the e-note reading device. The ability of a mobile device to read an e-note within the e-note's communication footprint means that highly accurate positioning or other assistance information is available for location-enhanced mobile services. This location or assistance information would only be available where e-notes were deployed but could help provide location accuracy as an alternative to the handset (which contains the e-note reader) attempting to generate this information from other sources of assistance data that may not be available.

Figure 10:
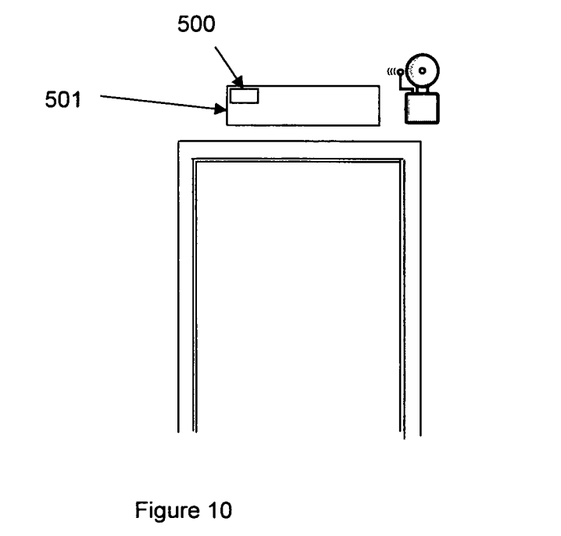
FIG. 10 shows a second example application.

It could be expected that a building services manager would deploy position-encoded e-notes throughout a building as shown in FIG. 10. FIG. 10 shows an e-note signalling the emergency exit or the specific location (floor number or nearest exit or even the best exit route itself) within the building. Hence an e-note 500 is mounted on a suitable surface 501 (such as a sign) above a doorway. These could be planar devices, clearly marked with a legible copy of the stored data and employ a mix of charge storage/photovoltaic power source on board. To extend the useful operating life without light the planar e-note can be sized accordingly to enable its PV cell to charge a capacitor or battery within the e-note. Additionally, the e-notes could be encased in luminous material enabling them to be found easily in the dark so that users know where to find human and electronically readable (e-note) location information.

Motorcycle Presence Alert

Figure 11:
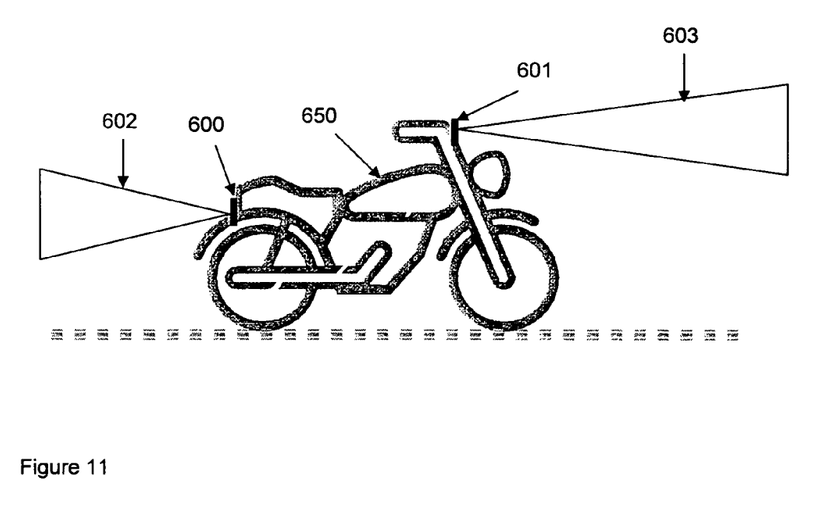
FIG. 11 shows a third example application.

Visual indicators of the presence of motorcycles (such as hi-visibility clothing worn by motorcyclists or driving with headlights turned on) can contribute to the reduction in Killed or Seriously Injured (KSI) riders every year. An e-note comprising a directional antenna, fixed code transmitter, moulded into the front fairing or rear license plate (as shown in FIG. 11) can provide an indication of motorcycle presence front and rear to readers with perceptive filters configured so that these broadcast messages would not be ignored by pedestrians or other road users. Shorter range e-notes located on the side of the bike could provide similar broadcasts but within a smaller physical envelope.

As shown in FIG. 11, an e-note 600 is located at the rear of a motorcycle 650. The e-note 600 has a relatively small solid angle of transmission, indicated at 602. A second e-note 601 is mounted for example to the front fairing and transmits at a relatively narrow solid angle 603, being reflected by radiation, such that the radiation received from each of the e-notes 600 or 601 may alert the driver of nearby vehicles to the presence of the motorbike 650.

The same e-note configuration can also apply to other road users such as horse riders or cyclists. The specific configuration of e-notes (size, mounting provisions, broadcast range, power source, etc.) will vary with each application.

Mobile Social Networking

Social networking concerns the connection of individuals by various means of media such as the Internet. An e-note that can be programmed by an suitably equipped mobile phone and stitched on an item of clothing, fixed to the surface of a moveable asset such as a car or incorporated into a label attached to a handbag and so on, could allow the individual to announce his/her presence together with a short message relating to the asset or user. The compact size, user-programmable, self-powered, flexible substrate and protective enclosure would allow the e-note to be used reliably in everyday environments for social networking by means of short messaging between an e-note and mobile phones within the communication range of the e-note (since this is most likely to impose the limitation on communication distance). Mobile phones equipped with perceptive filters would enable content types to be ignored on demand by the user by means of configuring the filter.

As will be appreciated from the examples described above, the devices of the present invention, in association with suitable readers, provide the ability to provide high quality and relevant data to users at a low cost.

An e-note is an assembly of multiple component technologies, a range of energy storage options that can be sized to meet various operational lifetimes, manufacturing process technologies and applications that require simple message exchange or message broadcast. Within this definition alternative approaches could depend on the following variations of the principal components:

Externally powering by direct galvanic connection or inductive coupling between a coil located within the e-note and an external powering coil;

Use of a metal substrate and low attenuation radome to permit high mechanical strength bonding to a supporting object;

Minimal component count e-note comprising a photovoltaic cell, rechargeable battery, automaton finite state machine and RF circuitry to broadcast a fixed message for a limited time or on detection of a predetermined event, and;

Battery activated by the user by bending or compressing the tag causing an internal mechanical or electronic switch to operate (when the device is first used or to activate it from a standby condition).

The invention claimed is:

1. A data communication system, comprising:
a data communication device for attachment to an object, the device comprising:
a flexible substrate;
a transmitter adapted to transmit data in the form of electromagnetic radiation wherein the data that is transmitted comprises descriptive data and content data, the descriptive data defining a category of the content data;
a programmable memory;
a controller for controlling the transmission of the data;
a programming means for programming the device; and,
a power source having:
a power storage device; and,
a power extraction means capable of extracting power from the environment in which the data communication device is located when in use; and
a reader for receiving electromagnetic radiation from a plurality of data communication devices that transmit content data in a plurality of different categories, the plurality of data communication devices including said data communication device, wherein the reader comprises a perceptive filter configured to distinguish data received from the data communication device from data received from other ones of the plurality of data communication devices, the perceptive filter being further configured to determine if content data received from at least one data communication device is relevant to the reader based on the descriptive data and to process the content data only from one or more of the plurality of data communication devices whose content data is relevant to the reader.

2. A device according to claim 1, wherein the device further comprises a radio-frequency antenna.

3. A device according to claim 1, wherein the controller comprises a microcontroller for processing the data.

4. A device according to claim 1, further comprising a receiver adapted to receive data in the form of electromagnetic radiation.

5. A device according to claim 4, wherein the receiver and transmitter are formed as an integral transceiver.

6. A device according to claim 4, wherein the controller comprises a baseband processor adapted to demodulate the electromagnetic radiation received into data and/or to modulate the transmitted electromagnetic radiation in accordance with the data to be transmitted.

7. A device according to claim 4, wherein the power extraction means is adapted to operate in the absence of electromagnetic radiation containing the received data.

8. A device according to claim 1, wherein the memory includes Read Only Memory (ROM) and Random Access Memory (RAM).

9. A device according to claim 1, further comprising an adhesive region for attachment of the device to the object.

10. A device according to claim 1, wherein the programming means further comprises an interface for connecting the device physically to an external device.

11. A device according to claim 10, wherein the interface comprises a galvanic coupling.

12. A device according to claim 1, further comprising one or more sensors adapted to monitor environmental conditions and/or the operation of the components of the device.

13. A device according to claim 1, wherein the power source comprises a battery or a charge storage device, and a photovoltaic cell.

14. A device according to claim 1, wherein the device is generally planar.

15. A device according to claim 1, wherein the transmitter is adapted to radiate electromagnetic radiation only in a first direction.

16. A device according to claim 1, wherein the device has a multi-layered construction.

17. A device according to claim 1, further comprising a protective coating.

18. A device according to claim 1, wherein the controller is adapted to communicate selectively with other apparatus using the electromagnetic radiation.

19. A device according to claim 18, wherein the controller is further adapted to communicate selectively in accordance with one or more of energy consumption, stored energy levels or data communication requirements.

20. A device according to claim 1, wherein the controller is adapted to control the power consumption of the device according to one or more predetermined criteria.

21. A data communication system according to claim 1, wherein the reader is further adapted to transmit electromagnetic radiation to the device.

22. A data communication system according to claim 1, wherein the perceptive filter is further configured such that the content data is only obtained by the reader from the said device.

* * * * *